June 23, 1942.  W. R. WEEKS  2,287,582
COVER STRUCTURE
Filed March 22, 1940
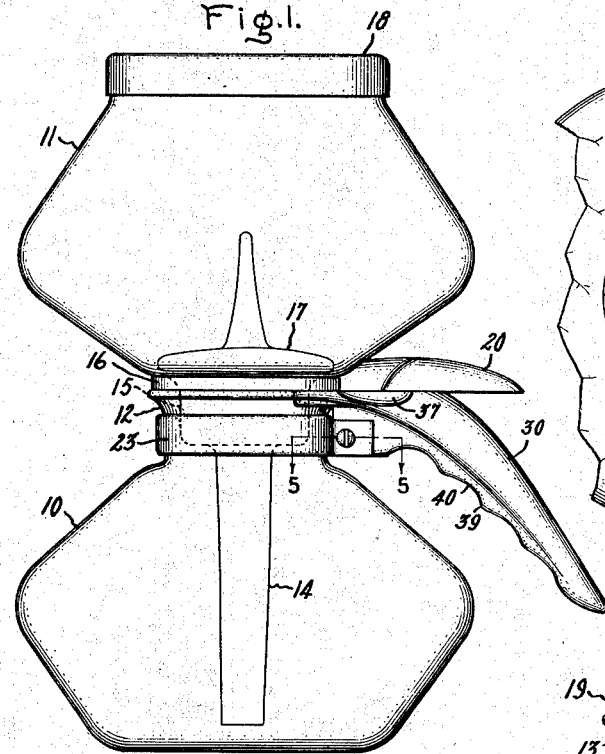
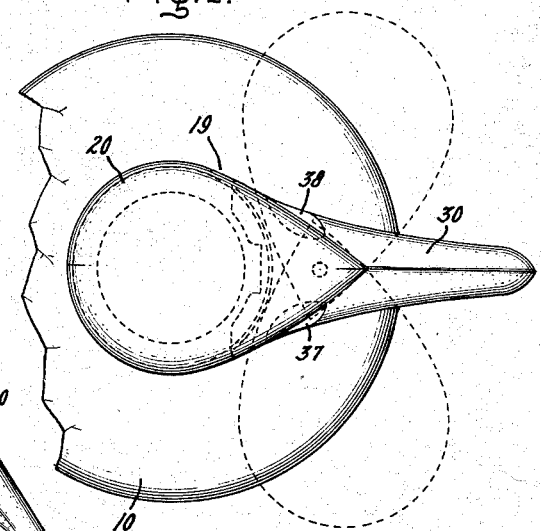
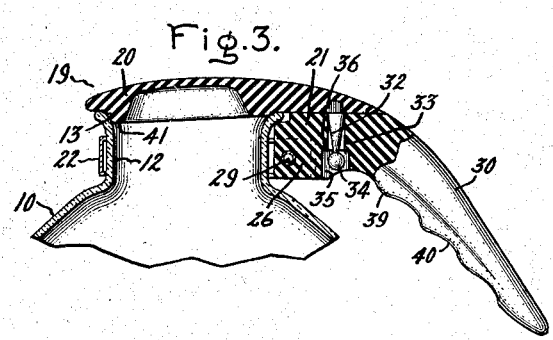
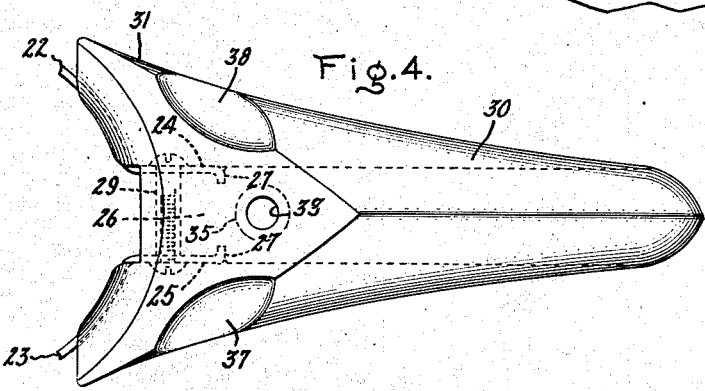
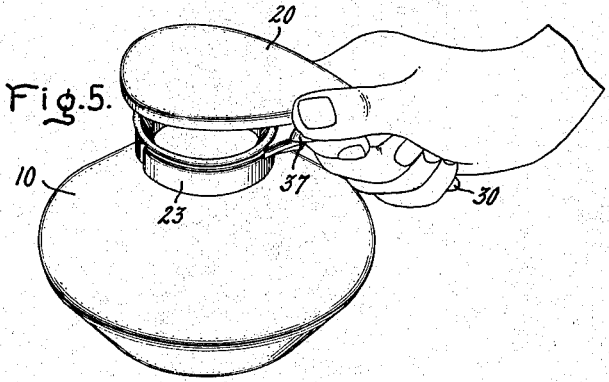
Inventor:
Walter R. Weeks,
by Harry E. Dunham
His Attorney.

Patented June 23, 1942

2,287,582

UNITED STATES PATENT OFFICE 2,287,582

COVER STRUCTURE

Walter R. Weeks, Hamden, Conn., assignor to General Electric Company, a corporation of New York Application March 22, 1940, Serial No. 325,428

4 Claims. (Cl. 53—3)

This invention relates to cover structures, more particularly, to cover structures for coffee makers and the like, and it has for its object the provision of an improved device of this character.

This invention is particularly applicable to coffee makers of the vacuum type wherein two bowls are provided, one positioned on the other. A liquid transfer member connects the two bowls together; generally, this member is in the form of a tube attached to the upper bowl, and arranged to be received in the opening in the lower bowl when the upper bowl is placed in its operating position on the lower bowl. In the operation of coffee makers of this type, the coffee to be brewed is placed in the upper bowl on a suitable filtering device that covers the opening to the transfer tube. The water is placed in the lower bowl and is heated. As the water heats up, vapor is generated, and eventually the pressure of the vapor and heated air above the liquid level in the lower bowl forces the heated water therein up through the transfer tube into the upper bowl where it steeps the coffee. The heat is then removed from the lower bowl to permit it to cool. As the lower bowl cools, the vapor therein condenses, and as a result, the pressure in the lower bowl is reduced so as to cause the coffee infusion in the upper bowl to be forced down through the filter and transfer tube to the lower bowl. After this, the upper bowl may be removed, and the infusion poured from the mouth of the lower bowl, as desired.

This invention contemplates the provision of an improved cover structure for the lower bowl having a suitable cap or lid covering the mouth of the bowl to keep the coffee brew warm until it is desired to use it. It further contemplates a cover structure which is attached to the bowl, and is so constructed and arranged that the lid or cover may be moved to such a position that the transfer tube may be freely inserted in the lower bowl and the upper bowl placed upon it without interference from the lid. Furthermore, it is an object of this invention to provide a cover structure having a suitable hand-grasping member which is utilized to tilt the bowl to pour the coffee brew from it, and the cover structure being so arranged that when the handle is grasped for the purpose of pouring the brew, the cover will be automatically engaged by the hand and moved to an open position.

In accordance with this invention, the cover structure comprises a suitable member adapted to be attached to the bowl, and which is arranged to support a cover or lid. Suitable means are provided for connecting the lid to the supporting member so that the lid may be moved laterally to and from its covering position over the opening of the bowl. A handle is attached to and is a part of the supporting member. The handle is so arranged with relation to the cover that when it is grasped naturally for the purpose of tilting the bowl to pour the coffee brew from it, the cover is engaged by the hand and moved to an open position. In one form of this invention, the handle is provided with a series of ribs forming depressions in which the fingers of the hand are received, and with a thumb rest so positioned with relation to the cover that when the handle is grasped with the fingers in their depressions and the thumb moved to its rest, the cover is engaged by the thumb and moved to and held in an open position.

Also in one form of this invention, the cover is provided with a depending tapered flange which is so arranged that when the bowl is returned to its normal upright position after pouring and the thumb moved from its rest, the flange will engage the opening in the bowl to center or return the cover to its closed position.

For a more complete understanding of this invention, reference should be had to the accompanying drawing in which Fig. 1 is a vertical elevation of a vacuum type coffee maker provided with a cover structure for the lower bowl arranged in accordance with this invention; Fig. 2 is a fragmentary plan view of the lower bowl of the coffee maker of Fig. 1, showing the cover in its closed position; Fig. 3 is a fragmentary vertical sectional view of the lower bowl of Figs. 1 and 2; Fig. 4 is an enlarged fragmentary plan of a portion of the cover structure; and Fig. 5 is a perspective view illustrating the cover structure when grasped by the hand for the pouring operation.

Referring to the drawing, this invention has been shown as applied to a vacuum type coffee maker having a lower water heating and brew receiving bowl 10, and an upper coffee infusion or steeping bowl 11. The lower bowl 10 is provided at its upper end with an upright neck 12 which terminates in an opennig 13 at its upper end. The upper bowl 11 is provided with a depending tube 14 which is arranged to be inserted in the lower bowl 10, as shown in Fig. 1. The upper section 15 of this tube is enlarged as shown, and surrounding this section is a flexible gasket 16 which is arranged to seat in the neck 12 so as to hold the upper bowl 11 in its operating position above the lower bowl. Seated in the upper bowl 11 over the mouth of the tube 12 is a filter or strainer 17 which may have any suitable construction. The upper bowl is provided with a cover 18.

In the operation of this device, the coffee grounds (not shown) are placed in the upper bowl 11 over the filter 17, and the water is placed in the lower bowl 10. The water in this bowl may be heated in any suitable manner, as by means of an electric stove (not shown). The water is heated until sufficient pressure is generated in the lower bowl to force it upwardly through the tube 14 and filter 17 into the upper bowl, where it steeps the coffee to make the coffee infusion. The heat is then shut off from the lower bowl to permit it to cool and thereby cause the vapor in the bowl to condense. This reduces the pressure in the lower bowl and the prepared coffee infusion in the upper bowl is forced down into the lower bowl. Then the upper bowl may be moved from the lower bowl and the coffee brew poured from the bowl, as desired.

A suitable cover structure 19 is provided for the lower bowl. This cover structure comprises a lid or cover 20 which is arranged to seat in the opening 13 of the upright neck 12. The cover 20 is attached to a supporting member 21 which is rigidly attached to the neck 12. For this purpose, I prefer to use an attaching means such as described and claimed in Patent No. 2,137,884 to me, dated November 22, 1938. As shown, two semi-circular rigid members 22 and 23 are positioned on opposite sides of the neck 12. If desired, a suitable rubber collar (not shown) may be positioned about the neck so as to be interposed between the neck and the clamping members. The adjacent ends of the clamping members on one side of the neck are provided with outwardly extending arms 24 and 25 respectively which are arranged in substantially parallel relation with each other and which function to secure the supporting member 21. As shown, the supporting member is provided with a section 26 which is inserted between the parallel portions 24 and 25. The section 26 is provided with recesses 27 which receive the members 24 and 25 as described in the aforesaid patent. The two portions 24 and 25 and the section 26 of the supporting member are rigidly clamped together by a screw-fastening device 29 which passes through apertures provided for it in the members 24, 25 and 26.

The supporting member 21 is provided with a hand-grasping portion 30 whereby the support may be grasped by the hand for the purpose of tilting the bowl to pour the brew from it, as shown in Fig. 5. As shown, the hand-grasping portion 30 widens out as it approaches the supporting portion 21 and terminates in a relatively widened section 31 above the section 26 that is clamped between the members 24 and 25.

The cover 20 is provided with a pin 32 at one side of the opening 13 and which is received in a passageway 33 provided for it in the supporting member 21. This pin functions to pivotally connect the cover 20 to the supporting member so that the cover may be swung laterally in either direction to uncover the opening 13 on an axis substantially parallel with the central axis of the opening, as shown. The pin 32 at its end remote from the cover is provided with an enlarged sphere-like section 34 which is somewhat smaller in diameter than the passageway 33. The section 34 is received in an enlarged passageway 35 which is a continuation of the passageway 33, the two passageways defining a shoulder 36. This shoulder prevents the cover from falling when the bowl is inverted. When the bowl is inverted, the cover in falling away from its supporting member pivots at the end of the passageway 33 in such a way that the sphere section 34 is swung to one side of the passageway 35 so as to engage the shoulder 36 to prevent separation of the cover from its supporting member. The cover may be removed, however, by drawing it with its pin 32 and sphere 34 from the passageway 33, 35.

The supporting member 21 is provided with right and left-hand thumb rests 37 and 38 which are so positioned with relation to the cover that when the handle 30 is grasped and the thumb naturally moved to its rest 37, 38 for the purpose of pouring brew from the bowl 10, the thumb will engage the side of the cover and will move it laterally to an open pouring position, as shown in Fig. 5. More specifically, the thumb rests are provided at the sides of the support and on opposite sides of a line joining the axes of the opening 13 and the opening 33 that receives the pin 32, and further are so positioned that relatively large parts of their areas lie under the cover when it is closed, as clearly shown in Fig. 2; thus, when the thumb is moved into one of the rests it necessarily engages the adjacent side edge of the cover to shift it laterally from its fully closed position. The two rests 37 and 38, of course, provide for this action by right and left-handed persons. Preferably, the underside of the handle 30 will be provided with a series of spaced ribs 39 which define depressions 40 between them in which the fingers of the hand may be fitted. It will be understood that these depressions will be so located with reference to the thumb rests that when either a right or left-handed person grasps the handle with the fingers in the depressions 40 and the thumb moved to its rest the cover will be engaged in the manner previously described and moved to its open position.

The cover is provided with a downwardly extending inwardly tapering flange 41 which is arranged to cooperate with the opening 13 so that when the bowl is returned from its pouring position toward which it is being moved in Fig. 5 to its normal upright position and the thumb removed from its rest, the flange will engage the edges of the opening to center or return the cover to its normal closed position.

The cover may also be moved in either direction to wide-open positions, indicated by the dotted lines in Fig. 2, so that the tube 14 may be freely inserted in the lower bowl and the upper bowl seated in the opening 13.

While the cover 20, its support 21 and the handle 30 may be made of any suitable material, I prefer to make them of a suitable phenol condensation product.

It will be observed that I have provided a simple, inexpensive and efficient cover structure which is attached to the bowl. Moreover, it is constructed and arranged so that merely by grasping the handle naturally the cover is moved to an open pouring position, and is returned or centered automatically when the bowl is returned to its normal upright position and the thumb removed from the rest. Furthermore, the cover structure provides for movement of the lid or cover to such extreme positions that the tube of the upper bowl may be inserted in the lower bowl, and the upper bowl seated on the lower bowl without removing the cover structure from the lower bowl. The cover member 20 may be removed by drawing it with its pin 32 from the passageway 33, 35.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a coffee maker and the like having a bowl provided with a top opening, a handle attached to said bowl adjacent said opening and having a laterally extending hand-grasping portion, a lid for covering said opening, a pivotal connection between said handle and said lid providing for swinging movement of said lid laterally from its position over said opening to a position where it uncovers said opening on an axis substantially parallel with the central axis of said opening, and a depressed thumb rest formed in one side of said handle having a substantial area thereof lying under said cover when it is closed so that when said hand-grasping portion is grasped for pouring and the thumb is moved to said rest, the thumb engages the side edge of said lid and shifts it laterally from its fully closed position to an open position.

2. In a coffee maker and the like having a bowl provided with a top opening, a handle attached to said bowl adjacent said opening and having a laterally extending hand-grasping portion, a lid for covering said opening, a pivotal connection between said handle and said lid providing for swinging movement of said lid laterally from its position over said opening to a position where it uncovers said opening, a depressed thumb rest formed in said handle at one side of a line between the axis of movement of said lid and the axis of said opening, one side edge of said lid overlapping said thumb rest so that only the outer area thereof is exposed, whereby when the hand grasping portion is grasped for pouring and the thumb moved to said rest, the thumb engages the side edge of said lid and shifts it laterally from its fully closed position to an open position.

3. A cover structure for a vacuum type coffee maker bowl comprising a hand-grasping member adapted to be attached to said bowl and a cap for covering the pouring opening of said bowl, a pin having one of its ends attached to said cap, said pin received in a passageway provided for it in said handle so that said cap can be rotated in the axis of said pin between open and closed positions, the pin extending through said passageway and having an enlarged section formed on its other end outside of said passageway, said enlarged section being of such size that it may be withdrawn through said passageway so that said cap can be separated from said handle, irrespective of the angular position of said cap in said axis, and said enlarged section preventing said cap from falling accidentally from said bowl.

4. A cover structure for the lower bowl of a vacuum-type coffee maker and the like comprising a lid for said bowl, a handle member attached to said bowl, a member pivoting said lid to said handle member for swinging movement laterally from a first position where it covers said opening to a second position wherein it opens said opening whereby liquid can be poured from the bowl, said handle member having a hand grasping portion and a thumb rest so positioned with relation to the lid that when the hand-grasping portion is grasped to tilt the bowl to pour liquid from it and the thumb moved to said rest, the lid is engaged by the thumb and swung laterally to said second position to permit the liquid to flow from said opening, and said lid having a downwardly extending inwardly tapered flange constructed and arranged to engage the mouth of said opening to shift the lid to its position over said opening when the bowl has been returned to its normal position after pouring and the thumb is removed from said rest.

WALTER R. WEEKS.